L. B. SMITH.
Seed-Planters and Fertilizers.

No. 150,199. Patented April 28, 1874.

Witnesses.
T. J. Wilson
F. H. Coleman

Inventor.
Lemuel Banks Smith
per J. E. Lamplier
Attorney.

UNITED STATES PATENT OFFICE.

LEMUEL BANKS SMITH, OF DE SOTO COUNTY, MISSISSIPPI.

IMPROVEMENT IN SEED-PLANTERS AND FERTILIZERS.

Specification forming part of Letters Patent No. 150,199, dated April 28, 1874; application filed March 3, 1873.

*To all whom it may concern:*

Be it known that I, LEMUEL BANKS SMITH, of the county of De Soto and State of Mississippi, have invented certain new and useful Improvements in Combined Fertilizer-Distributers and Seed-Planters, of which the following is a specification, reference being had to the accompanying drawing forming part of this specification.

My invention has for its object to provide a machine simple and substantial in its structure, which will ridge the land, open a furrow in the top of the ridge, prepare the earth, and plant and cover the seed, where, by reason of the dampness or coldness of the land, or from the nature of the seed to be planted, it is found necessary or desirable to throw the ground into ridges, and plant the seed on the top thereof; and a further object is to so arrange the several parts that the ridge shall be first formed; then a furrow opened in the top of the ridge; then the seed dropped accurately in the furrow, and covered by means of a roller. It consists in providing a substantial frame, which is journaled to and carried by the axle connecting the driving-wheels, and which is provided on its upper side with a hopper for receiving the seed or fertilizing material. To the front end of the frame are attached two ridging-shares, so arranged as to throw their furrows together and form a ridge of earth. The standards connecting the shares with the frame are provided with suitable threads and nuts, and move in slots in the frame, so that they may be set to plow deeper or shallower, or to form a wider or narrower ridge, as may be desired. An opening-tooth is placed in rear of the shares, and so arranged as to open a furrow in the top of the ridge formed by said shares. A cylinder, having its periphery provided with a series of recesses, is attached to and revolves with the axle of the wheels, and is so arranged that it communicates with the hopper, and so that it will drop the seed directly into the furrow formed in the top of the ridge. A concave roller is attached to the rear of the frame by suitable links, and so arranged as to pass centrally along the ridge formed by the shares, covering the seed, and rolling the earth.

My invention will be better understood by reference to the accompanying drawings.

Figure 1:
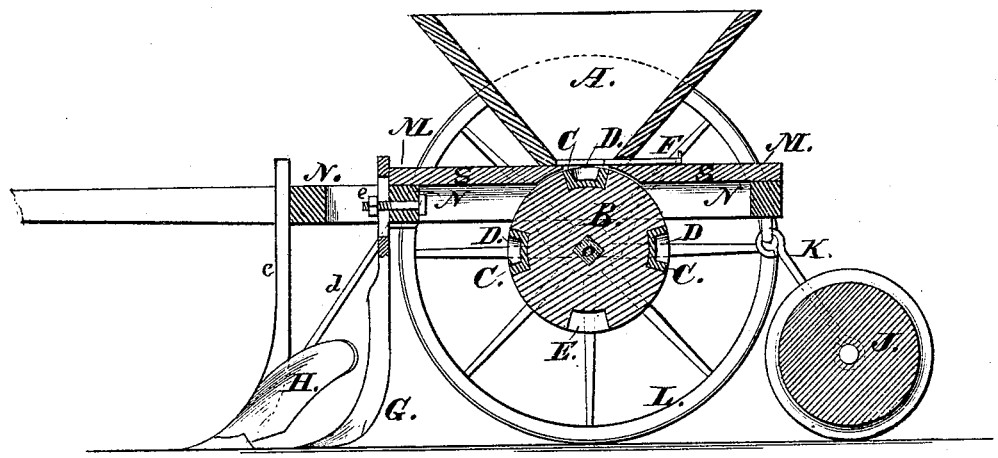
Figure 2:
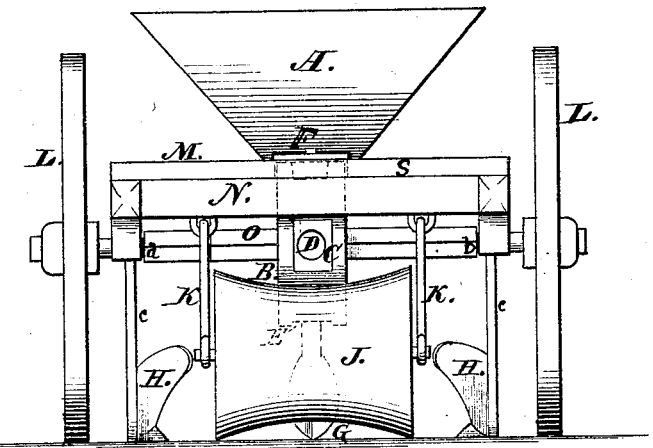

Figure 1 is a longitudinal sectional view, and Fig. 2 is a rear elevation, of my invention.

O is a square axle carried by the wheels L L. It is rigidly fixed to and revolves with one of the wheels, but fits into the other wheel by a spindle, on which said other wheel revolves. It is provided with journals at $a$ $b$, to which is secured the frame of the machine. M is the frame, composed of the platform S and side and end pieces N N. It is provided with bearings, in which move the journals, and is secured to the axle by suitable iron straps passing around said axle at the journals. A is the hopper for holding the seed, and F is a slide for closing the lower end of said hopper when it is desired to prevent the contents thereof being discharged, as hereafter described. On the under side of the platform S, immediately below the hopper, is made a semicircular chamber, which is so constructed that the arc describing it passes flush with the upper side of the platform, and forms an opening through which the seed passes to the cylinder, hereafter described. H H are two shares, arranged so as to throw two furrows together, forming a ridge, on which the seed is planted. They are attached to the frame by means of the standards $c$ $c$ and braces $d$, and are regulated by means of set-nuts and slots, so that they may be raised or lowered, according as it may be desired to plow shallower or deeper, or set nearer together or wider apart, according as may be desired to make a narrow or wide ridge. G is a tooth for opening a furrow in the top of the ridge formed by the shares H. It is secured to the frame N by the bolt $e$, and has its upper end slotted, so that it may be raised or lowered, as required. J is a concave roller attached to the rear of the machine by the links $k$, for the purpose of covering the seed. B is a cylinder, rigidly attached to and revolves with the axle O, and is so constructed and adjusted that it accurately fits, and in its revolutions turns, in the semicircular chamber in the platform S, and closes the opening into the hopper A. It is provided with four or more square or oblong recesses, E, each having a capacity equal to about half an ordinary tea-cup. C are removable distributing-blocks, made to accurately fit the cavities E, and are provided with cavities or recesses D. They are secured to the cylinder by a screw in the bottom of the cavities D. These blocks are provided in order to regulate the quantity of seed dropped. By using blocks with small recesses very small seeds may be dropped, and by using other blocks having larger recesses, larger seeds, or seeds in large quantities, may be dropped. By using solid blocks to close the recesses E, the cylinder can be made to drop from every alternate cavity, or all may be closed but one, so that the seed will be dropped once in an entire revolution of the cylinder.

In the operation of the machine, the seed or fertilizer is received from the hopper into the recesses of the cylinder or blocks, and is dropped into the furrow in the top of the ridge, and is covered by the concave roller.

The machine may be constructed for two horses or one, as may be desired for heavier or lighter work.

Any ordinary planting-tube may be attached, so as to keep the seed, when dropped, from scattering too much.

Having described my invention, what I claim, and desire to secure by Letters Patent, is—

The combination of the ridging-shares H H, furrow-opener G, hopper A, axle and seed-cylinder B, and concave covering-roller J, as and for the purpose specified.

LEMUEL BANKS SMITH.

Witnesses:
T. J. WILSON,
J. E. LANPHIER.